Feb. 18, 1936.  C. D. HAVEN  2,030,869
MULTI-PLY GLASS SHEET GLAZING UNIT
Filed Oct. 12, 1934    8 Sheets-Sheet 1

Inventor
CHARLES D. HAVEN.
By Frank Fraser
Attorney

Feb. 18, 1936.  C. D. HAVEN  2,030,869
MULTI-PLY GLASS SHEET GLAZING UNIT
Filed Oct. 12, 1934   8 Sheets-Sheet 2

Inventor
CHARLES D. HAVEN.
By Frank Fraser
Attorney

Feb. 18, 1936.  C. D. HAVEN  2,030,869

MULTI-PLY GLASS SHEET GLAZING UNIT

Filed Oct. 12, 1934    8 Sheets-Sheet 3

Inventor
CHARLES D. HAVEN.
By Frank Fraser
Attorney

Feb. 18, 1936.  C. D. HAVEN  2,030,869
MULTI-PLY GLASS SHEET GLAZING UNIT
Filed Oct. 12, 1934   8 Sheets-Sheet 4

Inventor
CHARLES. D. HAVEN.
By Frank Fraser
Attorney

Feb. 18, 1936.　　　　C. D. HAVEN　　　2,030,869
MULTI-PLY GLASS SHEET GLAZING UNIT
Filed Oct. 12, 1934　　　8 Sheets-Sheet 5

Inventor
CHARLES D. HAVEN.
By Frank Fraser
Attorney

Feb. 18, 1936.  C. D. HAVEN  2,030,869
MULTI-PLY GLASS SHEET GLAZING UNIT
Filed Oct. 12, 1934   8 Sheets-Sheet 7

Inventor
CHARLES D. HAVEN.
By Frank Fraser
Attorney

Feb. 18, 1936.  C. D. HAVEN  2,030,869
MULTI-PLY GLASS SHEET GLAZING UNIT
Filed Oct. 12, 1934   8 Sheets-Sheet 8

Inventor
CHARLES D. HAVEN.
By Frank Fraser
Attorney

Patented Feb. 18, 1936

2,030,869

UNITED STATES PATENT OFFICE 2,030,869

MULTI-PLY GLASS SHEET GLAZING UNIT

Charles D. Haven, Milwaukee, Wis., assignor to The Thermopane Company, Toledo, Ohio, a corporation of Ohio Application October 12, 1934, Serial No. 748,109

20 Claims. (Cl. 20—56.5)

The present invention relates to a commercially practical, single unit multiple glass sheet glazing construction consisting of two or more sheets of glass spaced apart by separating means cemented between the glass sheets entirely around their edges. Such a product has been manufactured and sold commercially by the Thermopane Company, assignee of the present application, under the trade-name of "Thermopane" and throughout the application, the word "Thermopane" will be understood to designate a single unit multiple glass sheet glazing construction of this character.

The broad idea of making a double sash glazing unit by cementing a spacer or separator strip about the perimeter of two sheets of glass to create an internal air space has been disclosed in a number of prior art patents, some of which have already expired. However, so far as I am aware, none of these prior art suggestions have been commercially practical and my own attempts to produce satisfactory glass in accordance with the teachings of these prior art suggestions have resulted in utter failures.

Broadly speaking, such a fabricated glass is desirable, if properly made and of permanent characteristics, wherever it is important to reduce heat transfer and to prevent condensation of moisture upon glass in glazed openings. Technically, the advantages of such a single unit double sash glazing construction comparable to Thermopane have been appreciated for a long time. The difficulty has been in constructing a fabricated article capable of giving the intended results and able to stand up in use.

Ordinarily, Thermopane is used in such a way that the sheet of glass positioned interiorly of the opening is subjected to a different temperature or other atmospheric conditions than that to which the outer sheet is exposed. For example, in a building in the winter time the outside sheet of glass is subjected to rather low temperatures while the inner sheet of glass is exposed to relatively much higher temperatures. Therefore, in such cases one sheet of glass expands or contracts to a greater or lesser extent than the other sheet as the case may be, with the result that there is a decided strain upon the bond between the glass sheets and the separator material cemented therebetween. This differential in expansion and contraction of the two sheets of glass, coupled with the other varying conditions to which the glass is normally subjected has, in all cases within my knowledge (with the sole exception of the glass made and sold as Thermopane) been sufficient to break down the bond between the glass and the separator and to otherwise adversely affect the structure, resulting in failure thereof.

In use, the glass sheets of a Thermopane construction are subjected to strains from changes of internal pressure due to changes of the temperature of the air within the space between the glass sheets and also from changes in barometric pressure of the outside atmosphere. The strains set up by these varying pressure conditions coact with the expansion or contraction of the two sheets of glass in a tendency toward breaking down the bond between the parts and injury to the sealing coatings.

Various ideas have been suggested as to the desirable predetermined conditions to be created in the space between the glass sheets, some advocating slight evacuation of the space; others suggesting filling the space with a gas. In my opinion, based on practical results, the most satisfactory medium is dehydrated air sealed in at normal atmospheric pressures. However, regardless of the predetermined conditions established between the glass sheets at time of manufacture, it is apparent that breaking down of the bond between the glass and separator disrupts these conditions by reason of air, moisture, putty oils, and other foreign elements seeping into the space which result in a very rapid deterioration of the unit as a whole.

From a cost standpoint, it is preferred to use ordinary plate and window glass made from well known soda-lime batches. Such plate and window glass, when placed in an installation where both sides thereof are freely exposed to the atmosphere, will give satisfactory service from a weathering standpoint for a long period of years. However, it has been found that as a rule when plate and window glass is installed in such a way that both surfaces thereof are not exposed freely to the atmosphere, such unexposed surfaces become stained or effloresce. This staining, fading, or efflorescing of the glass on the interior of a double sash glazing construction has been one of the many obstacles standing in the way of commercial success of this type of glass unit. In fact, some attempts have been made to avoid staining of the glass by using glass made from specially compounded batches to minimize this tendency toward staining. In my judgment, the explanation for glass failure in prior art double sash constructions has been due to the improper fabrication of the article in the first instance and inability of the article to maintain the originally established conditions between the glass when in use.

In accordance with my inventions, the glass sheets are first properly cleaned and then assembled with a separator strip about the edges which is manufactured and prepared especially for the purpose; then the space between the glass sheets so formed is thoroughly dehydrated in a manner that the air itself is not only dehydrated but the separator material is, in effect, superdried so that it will not, when in use, throw off moisture or volatile gases into the space but, to the contrary, will tend to absorb any traces of moisture that might possibly be left in the air space. The finished Thermopane also includes a unique multi-layer seal arranged about the perimeter of the assembly to effectively and permanently protect the bond between the separator and the glass as well as the separator itself from all outside influences including air, moisture, and putty oils.

The structure of the spacer strip and mode of bonding the same to the glass is such that a differential in the expansion and contraction of the glass sheets or a pressure difference between the air space and the outside air will not produce a failure of the bond and, furthermore, the sealing materials and methods of applying them serve to permanently hermetically seal the marginal portions of the fabricated article.

It is of vital importance that the bond between the separator and glass and the hermetic sealing thereof be permanent because if any seepage is permitted, moisture and other foreign matter entering between the glass sheets will set up or promote a staining or fading of the inner surfaces of the glass. Not only this, but the surfaces become otherwise soiled and as it is impossible to reach them for cleaning purposes, the clarity and transparency of the glass is ruined. Furthermore, internal condensation takes place between the glass sheets and condensation is usually one of the things the double sash unit type of glass is intended to prevent.

The basic object of the invention is to provide a single unit multiple glass sheet glazing construction which possessses the desirable characteristics as an insulator, is moisture and frost resisting, and will give satisfactory service for a period of years and have a life comparable to that of a single sheet of glass used under the same conditions.

Some of the advantages gained by the use of Thermopane are that it makes possible a lower initial cost of heating plant installation in buildings; reduces heating cost of buildings ordinarily saving from about 46% to 60% of the heat loss through single glass; raises the low temperature in proximity to windows in winter time; provides clearer vision and cleaner windows, being moisture and frost resisting; and permits higher humidity, without condensation, for health purposes in cold weather.

Furthermore, Thermopane fills a dire need in air conditioned buildings and vehicles; replaces storm windows, thus saving erection, labor and cleaning in addition to being more efficient; and it saves material loss in cooled or refrigerated rooms, refrigerators, and display cases. It also has sound insulating properties and even though possessing all of these and other properties permanently, Thermopane can be installed like a single sheet of glass in all glazed openings and when so installed, it looks like a single sheet of good, clear, clean glass.

Other objects and advantages of the invention will be made apparent during the course of the following description.

In the drawings wherein like numerals are employed to designate like parts throughout the same.

Prior to fabrication of the glass into Thermopane, it is extremely important that the glass sheets used be thoroughly cleaned, not only from an appearance standpoint but from the standpoint of durability of Thermopane when in use. The first step in my process of cleaning the glass consists in soaking the glass sheets in a body or bath of clean water maintained at approximately room temperature or at slightly elevated temperatures to remove labels, glue, and other water soluble or water removable substances that may be on the surfaces of the glass. Varying amounts of ammonia can be added to the water bath especially where it is desired to shorten the period of water treatment.

In my opinion, a very important function of the water soaking treatment of the glass sheets is in the removal of water soluble alkalies at the surfaces thereof. Sodium and calcium hydroxides are probably the main soluble alkalies washed from the surfaces of the glass, and I believe that removal of these alkalies from the surfaces of the glass plays an important part in holding down or entirely preventing deleterious staining or efflorescence of the glass sheets when subsequently fabricated into Thermopane.

The length of time the glass sheets are subjected to the water soaking process can be varied, depending upon the production schedule and while in some cases as little as fifteen minutes may be sufficient to accomplish the intended results, as a matter of precaution it is preferred that the glass be subjected to the action of water for a longer period and several hours is not too much. While the paper labels, glue, ordinary dirt, and other water removable materials present on the glass will usually be removed within fifteen minutes, to give the soluble alkalies a chance to be washed from the surfaces of the glass, a greater length of time than that required to remove the labels, etc., is preferred. After removal from the bath of water, the glass sheets may be stacked, drained, and dried, and the degree of drying used to meet different conditions will be explained hereinafter.

The glass sheets are then subjected to the cleaning action of a second fluid or solvent capable of dissolving greases, perspiration and similar matter upon the glass which is rather difficult to remove and which is not readily attacked by water. Likewise, there may be deposits or films upon the glass surfaces as a result of its manufacture and annealing. It is important that this foreign matter be removed from the glass, and alcohol or similar solvents can be used for this purpose.

A mixture of alcohol and some non-glass cutting abrasive such as whiting (chalk) is very satisfactory. The whiting or other mild abrasive not only serves to cut away the deposits of foreign matter upon the surfaces of the glass without detriment thereto, but also acts as a carrier for the material taken off by the solvent or solvent mixture so that as the alcohol or other solvent loosens the foreign matter, the abrasive included in the mixture, in addition to its detergent action, tends to carry away the loosened material to give a clean surface.

After the paste or mixture of alcohol and whiting has been rubbed over the surfaces of the glass, the glass sheets are preferably subjected to a buffing action. The buffing action can be accomplished by passing the glass one or a number of times between a plurality of cotton buffer rolls positively driven and spaced sufficiently close that they will operate on both surfaces of the glass simultaneously. Of course the operator should wear clean gloves to eliminate any possibility of his soiling the glass, so that after the buffing operation the surfaces of the glass will be "mirror clean" and ready for use.

For best results, care should be exercised to prevent the building up of static electricity during the cleaning operation and to also prevent loading up of the buffing wheels with an undue amount of moisture. This can be controlled in a large degree of determining the amount of water left on the glass sheets following the water soaking step. In weather where the humidity is rather high great care is used in removing as much as possible of the water from the surfaces of the glass which prevents an excessive amount of moisture on the buffing rolls. On the other hand, when the surrounding air is relatively quite dry, a greater amount of water or moisture is left on the glass which serves as a diluent for the alcohol mixture, thereby retarding evaporation of alcohol and lessening the tendency for the building up of static electricity. Likewise, the alcohol mixture may be diluted with water where dry weather conditions are encountered.

To safeguard against varying conditions as to moisture upon the glass, the glass can be cleaned in a temperature and moisture controlled atmosphere so that ideal conditions can be established giving a balance between building up of static electricity and overloading of the rolls with moisture and foreign material.

Figure 1:
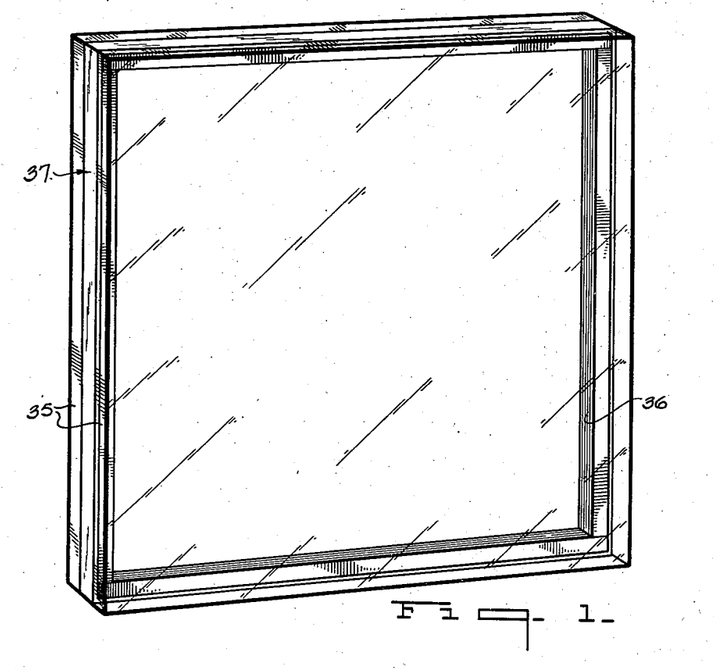
Fig. 1 is a perspective view of a finished sheet of Thermopane.

In Fig. 1 is shown a finished sheet of Thermopane comprising two sheets of glass 35 arranged in spaced relation and held apart by the yieldable separator strips 36 completely surrounding the marginal portions of the glass. The separator strips 36 are positioned slightly inwardly of the edges of the glass sheets, thus creating a channel in which is adapted to be arranged a seal, designated in its entirety by the numeral 37, which effectively protects the spacer strips and bond between the spacer strips and glass from the atmosphere and other elements to which the glass may be subjected when in use, for preserving the predetermined conditions established within the structure at time of manufacture.

Figure 2:
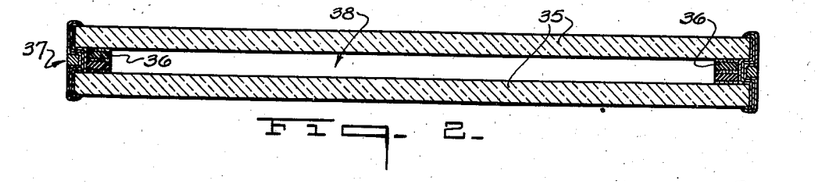
Fig. 2 is a transverse vertical section thereof with portions slightly exaggerated for purposes of illustration.

As shown more clearly in Fig. 2, the sheets of glass and spacer strips create the space 38 which contains dehydrated air at substantially normal atmospheric pressure. Obviously, for special installations, the pressure of the dehydrated air within the space 38 may be varied one way or the other to meet particular conditions.

Figure 3:
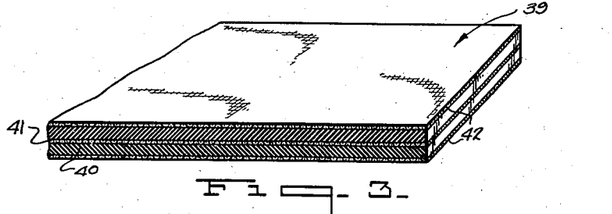
Fig. 3 is fragmentary perspective view, partly in section, of a sheet of laminated material from which the separator strips can be made.

The character of the material from which the separator strips 36 are made and the method of treating and preparing the same prior to bonding it to the glass is of vital importance insofar as the ultimate success to be obtained with the double sash glazing unit is concerned. Preferably, the separators are made from sheets of a laminated rubber compound covered on both sides with a suitable fabric. As shown in Fig. 3, a laminated sheet 39 comprises two laminations of rubber composition 40 between which is arranged a layer of fabric 41 with both outside surfaces of the rubber laminations being faced with the fabric material 42. The number of rubber and fabric laminations can be varied, although not less than two layers of rubber should be used for the reasons which will appear later.

When a double sash glazing unit, such as Thermopane, is placed in use, it is subjected to strains from internal pressure in the air space and from expansion and contraction of the two or more sheets of glass due to the fact that the temperature of the glass sheets is constantly changing with relation to one another. When a rigid type of separator is used, this movement of the glass sheets and change in pressure results in a cracking of the glass ordinarily in an arc from one corner of the glass as a center. So that even assuming that it is possible to obtain an adequate bond between a rigid type separator and the glass, the results obtained are not satisfactory because of breakage. In other words, if the bond is sufficient to hold the glass and separator together, the glass sheets will break and if the bond is not sufficient to hold the glass and rigid separator together, seepage is permitted so that in either event the glass is ruined.

Therefore, I use a yieldable separator possessing a slight degree of flexibility which, however, is not excessive, and a properly made rubber composition separator will serve in this connection. The rubber fabric combination employed has a slight degree of flexibility which is sufficient to prevent fracture of the glass due to the expansion strains but with enough firmness to withstand the usual compression and tension present without undue movement of the glass sheets toward or away from each other. The slight flexibility is advantageous as it lessens the load, so to speak, on the adhesive employed which is not the case when a non-flexible or practically rigid type of substance is used as the separator element.

I have discovered that solid rubber strips will not do even though they possess the requisite degree of flexibility. It seems that the rubber manufacturers are unable to produce commercially a sheet of rubber compound in a single layer of adequate and sufficiently uniform thickness to provide a continuous bond with the adhesive or uniform contact with both sheets of glass. Probably this is due to the fact that in the process of manufacturing the rubber sheeting, an equal distribution of the rubber material is not obtained so that the gauge of the sheeting varies because of greater or lesser volume of rubber material in the different areas thereof. The curing process is intended to produce a sheet of uniform thickness and while the uniformity of thickness is ordinarily sufficient for most purposes, it is not enough to give commercially satisfactory results in the making of Thermopane or similar constructions. Even though a single layer of rubber sheeting is substantially uniform in thickness after the curing process, from the moment of curing the area of higher compression in the rubber sheeting tends to expand, giving a material lacking in the necessary uniformity of thickness and therefore unsuited as a separator material in the making of Thermopane.

As a result of considerable experimentation, I have discovered that rubber sheeting can be used if made from a number of laminations. The variations of the individual layers of rubber are relatively slight when in the thicknesses used in producing the laminated sheeting and from the practical standpoint, the laminated rubber sheeting gives commercial results, while a single layer of rubber composition of the same thickness is not practical.

The sheeting 39 can be produced by cementing together layers of the rubber composition to give the desired thickness or the layers may be made with cloth or other fabric interlayers. The cloth insertions seem preferable to other insertions, particularly during cutting of the sheeting into strips of the desired width and in any event best results have been obtained when the outer surfaces of the laminated rubber sheeting are covered with the fabric layers 42.

Figure 4:
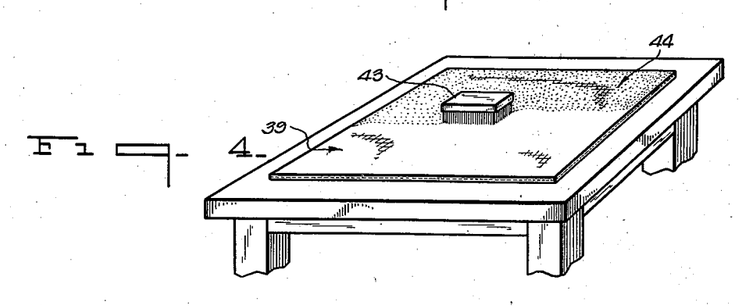
Fig. 4 illustrates treatment of the surfaces of the sheeting material of Fig. 3.

To prepare the laminated rubber fabric sheeting for use as a separator strip in Thermopane, both outer surfaces thereof are cleaned thoroughly, and this may be accomplished by scrubbing the rubber sheeting 39 as shown in Fig. 4 by means of a wire brush or similar implement 43. To facilitate cleaning, gasoline, naphtha, or other solvent for rubber cement can be applied during the scrubbing operation, the solvent serving not only to remove ordinary dirt and dust but also to remove excess rubber cement or other material that may be present as a result of the rubber manufacturer's operations. The wire brush is used not only for the purpose of removing dirt but to also roughen the fabric material, as indicated in the area designated by the numeral 44, upon the sheet 39 in Fig. 4. This cleaning of the surfaces and roughening of the fabric permits subsequent penetration of the adhesive coating into the body of the separator material, at least a sufficient depth to give proper adhesion to the glass. The increased absorbing power of the roughened fabric provides spaces into which any excess adhesive on the fabric surface may be forced or penetrate when pressure and heat is applied to the assembled parts. By reason of this penetration, excess of adhesive beyond the edges of the fabric may be reduced or prevented.

Figure 5:
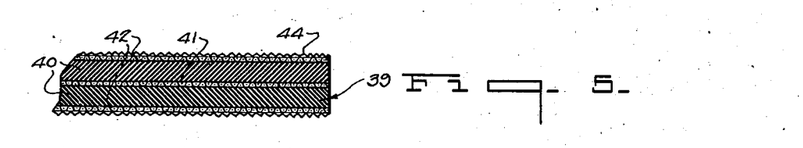
Fig. 5 is a fragmentary sectional view showing in exaggerated manner the surfaces of the treated sheeting.

Fig. 5 is intended to show diagrammatically the effect of the cleaning and roughening treatment of the fabric coatings wherein the surfaces are serrated in a manner to produce a plurality of spaced projections. The roughening treatment also serves to open up the spaces in and around the individual fibers of the threads of which the fabric is composed, allowing for subsurface penetration of the adhesive later applied. The importance of the roughened surface will be pointed out more in detail later and while the drawings have been exaggerated for purposes of illustration, nevertheless the roughening treatment in actual practice is such that the serrations or projections are readily discernible and have a direct bearing on the type of bond obtained between the glass and separator.

After both surfaces of the sheeting have been cleaned, they are ready to be coated with the adhesive material, and preferably the adhesive material is applied immediately prior to intended use of the strips so that it does not become unduly hardened. However, this is not absolutely necessary as a form of adhesive is and should be used that can be subsequently rendered adherent upon the application of suitable solvents and/or heat. The adhesive may be put upon the sheeting in any one of a number of different ways, and in Fig. 6 the adhesive coating 45 is being applied by means of a brush 46.

After coating both sides of the fabric with one or more applications of adhesive material and drying thereof, the sheeting is cut into strips of proper width. Thermopane is ordinarily made with a minimum of one-eighth inch air space, and this can be increased depending upon the degree of insulation required or other considerations. While it is not necessary, the width of the strip in the smaller sizes of Thermopane is approximately the same as the thickness, the thickness of spacer of course determining the size of air space, so that when a one-eighth inch air space is wanted, the rubber sheeting is one-eighth inch in thickness and is cut into strips approximately one-eighth inch in width. As far as the present invention is concerned, the width of the separator can be much greater, but ordinarily it is preferred to install Thermopane in such a way that the separator is not visible, and because of the types of window frames and other supports in current use, the width of separator is somewhat restricted if it is to be covered up by the Thermopane supporting frame.

Figure 7:
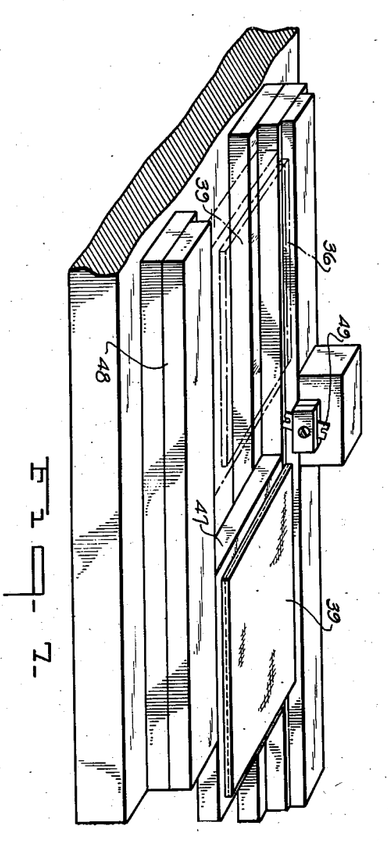
Fig. 7 is a perspective view showing cutting of of the sheeting material into strips.
Figures 8, 9, 10, 11:
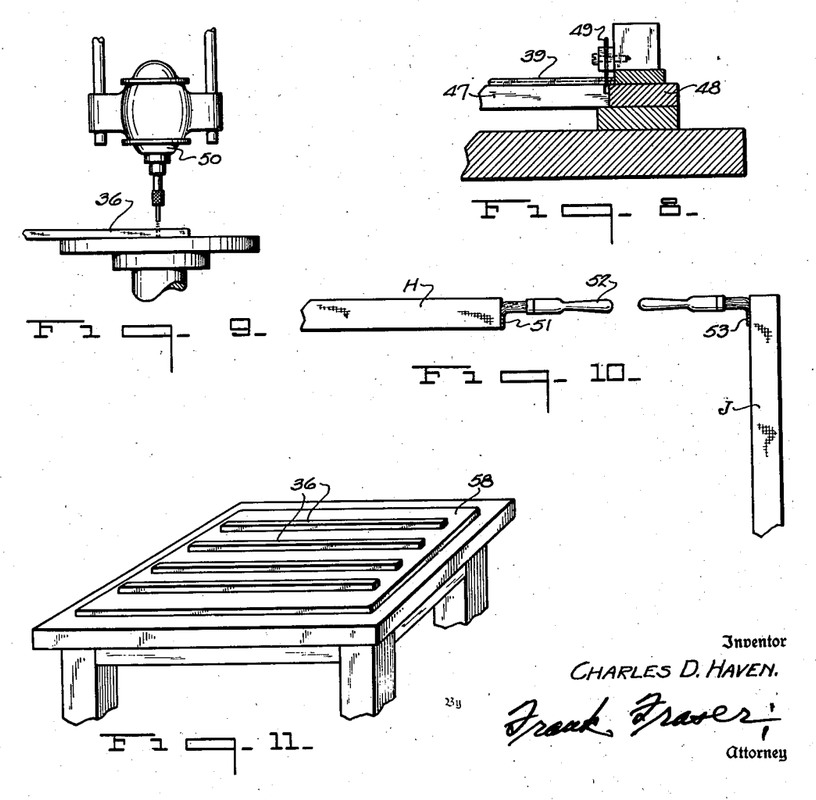
Fig. 8 is a fragmentary sectional view of a portion of the stripping machine.
Fig. 9 shows diagrammatically drilling of an opening transversely through one of the strips.
Fig. 10 illustrates the application of adhesive to those portions of the strips which contact when in assembled position.
Fig. 11 shows softening of one surface of the adhesive coated strips.

The sheeting can be very easily cut into strips by a machine such as is illustrated in Figs. 7 and and 8 wherein the sheeting 39 is placed on a longitudinally movable support 47 operable on the slides 48 so that as the support and sheeting are moved from right to left in Fig. 7, the blade 49 will cut entirely through the same to produce the strip 36 shown in dotted lines at the left of Fig. 7. In practice, when making the smaller lights of Thermopane, the length of the sheeting material used is sufficient to make two or more separators and therefore a number of separators are made at one time by first cutting the sheeting transversely a part of the way through and then when the sheet is cut on the machine, shown in Fig. 7, the entire length of the sheeting, a number of strips are produced by a single cut.

To permit dehydration of the air space and separators between the glass sheets after fabrication, two openings are provided and the simplest way is to form an aperture in two of the strips used. In Fig. 9 an ordinary drill 50 is employed to puncture the strip 36 laterally to produce an opening through which a hypodermic needle may be inserted.

Figure 23:
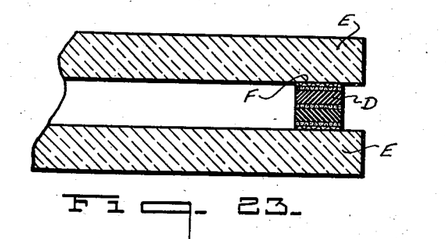
Fig. 23 is a fragmentary sectional view illustrating diagrammatically the type of bond obtained with my improved type of separator strip.
Figure 24:
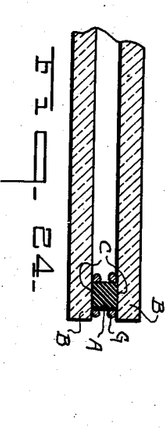
Fig. 24 is a similar view of another type of bond which is not desirable.

Considering more in detail the reasons for using the fabric coated rubber sheeting and roughening of the fabric as shown in Figs. 4 and 5, attention is directed to Figs. 23 and 24. In Fig. 23 is illustrated diagrammatically what I term an interrupted or point contact type of adhesion, while in Fig. 24 is represented what I express as a film type or continuous form of adhesion between the glass sheets and the separator.

In Fig. 24 the separator A is in contact with the glass sheets B throughout its entire width as shown at the contacting surfaces C. This type of bond probably represents maximum adhesion between the glass and separator so that it would seem that this would be the preferred manner of bonding the pieces together. As a matter of fact, in my early work I attempted to get maximum adhesion between the glass and separator, thinking that this would give the most permanent type of bond. It also appears that those in the prior art sought the same sort of adhesion, but careful research and analyses have proven that the type of bond illustrated in Fig. 24 is fundamentally wrong if the fabricated unit is to be subjected to varying temperatures causing what is in effect relative movement between the two or more sheets of glass.

If the glass sheets were not subjected to varying strains of different types, the continuous form of adhesion might be satisfactory, but in practice strains are present with an ever constant effort, so to speak, to break down the bond between the glass and the separator strips. Once a break occurs in the film type of bond or adhesion, the exposed line of contact of the adhesive toward the glass will continue to part from the glass surface so that eventually complete separation results. While the continuous film type of adhesive may resist separation for a limited time, once separation starts ultimate failure of the bond is quite rapid.

The importance of the interrupted type of adhesion is shown by tests wherein strains are set up at one corner of a sheet of Thermopane. These tests show that the continuous type of adhesive surface will separate more readily when separation is once started, the rate of separation increasing with a continuance of the strain, whereas the interrupted type of adhesion continues to resist separation.

In Fig. 23 is shown the interrupted type of bond wherein the separator D between the glass sheets E is bonded to the glass sheets through the intermediary of the serrations F and adhesive material. It is quite apparent that whereas in Fig. 24 the surfaces of the separator A are smooth and therefore in intimate contact with the glass surfaces, the separator D has a roughened surface so that there is no continuous contact, with the result that the separator in Fig. 23 is bonded to the glass at a plurality of spaced points. The interrupted or point contact form of adhesion thus obtained is perfectly adequate and, what is of great importance, it is permanent. It is permanent even though small areas of the bond may break down because in view of the interrupted character of adhesion there is no tendency for the separation to creep or spread over the entire area. A weakness or break at any one point of contact of the adhesive to the glass surface has no effect on adjacent points of contact and consequently separation does not take place from strains up to the breaking point of the glass itself.

In addition to the roughened character of the surfaces, the separator strip should have a degree of porosity sufficient to permit penetration of the adhesive below the surface and to also afford a place for any excess adhesive that may be present. During the bonding of the glass sheets to the separator strips, involving a continuous type of adherence such as shown in Fig. 24, any excess of adhesive present will squeeze out into the form of the globules G which will remain permanently trapped within the space between the glass sheets, being obviously detrimental to the appearance of the finished product.

However, with the interrupted type of adherence coupled with the porosity of the separator material, the slight amount of excessive adhesive fills the cavities between the spaced projections and is taken up by the material itself so that the globules do not form to any noticeable extent within the space between the glass sheets.

I have found that shellac makes an exceedingly fine adhesive and while other adhesives may of course be used, shellac is ideal because alcohol used as a solvent for shellac can be readily evaporated under heat during the baking or drying process utilized in producing Thermopane. An adhesive can be made by mixing one pound of shellac and four gallons of 180 proof alcohol. Shellac itself forms one of the best adhesives for glass if protected from excess of moisture or water which is the case here.

Figure 6:
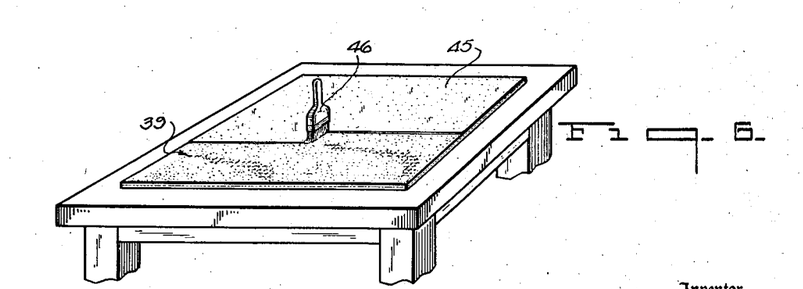
Fig. 6 shows diagrammatically application of adhesive material to the treated sheeting.

In applying the shellac to the cleaned and roughened fabric surfaces of the sheeting 39, a thin layer serving as a priming coat is preferably first used, and this is distributed as evenly as possible and then allowed to dry. Proper cleaning before application of adhesive allows the desired penetration of the shellac into the body of the sheeting and this is important to give the proper bond between the separator and glass. After the priming coat has been dried sufficiently, additional coats of shellac may be applied. Ordinarily, fifty to sixty minutes is ample for drying between successive coats. It is important that too much adhesive is not used and the formation of a smooth glossy surface upon the sheeting should be avoided. As indicated in Fig. 6, while the surface of the sheeting 39 is not as rough after the shellac adhesive has been applied, nevertheless after the final coating of adhesive has been put upon the sheeting, the surface should still be relatively rough to give the type of bond illustrated in Fig. 23. After the final coating of shellac or other adhesive is applied, it is permitted to dry to the extent that it can be handled and stripped into the separators without difficulty.

Following the stripping operation, wherein the sheeting is cut into strips of proper width, a cement is applied to the strips as illustrated in Fig. 10. As shown, the strip H has its end covered with a film of cement 51 by means of a brush 52, while the strip J has a film of cement 53 applied on the edge. As can be seen, the cement is applied to the strips upon those areas coming in contact when the strips are placed between the glass sheets so that the strips will be bonded together as well as to the glass sheets.

Figures 12, 13:
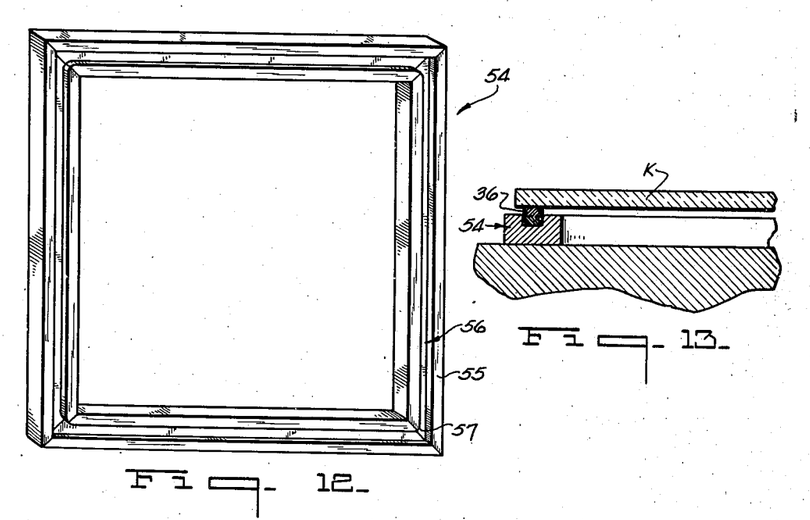
Fig. 12 is a plan view in perspective of a jig that can be used in assembling the separators and a sheet of glass.
Fig. 13 is a fragmentary sectional view showing a sheet of glass placed upon the separators while they are in the jig.

In Figs. 12 and 13 is shown a form of jig designated in its entirety by the numeral 54 which facilitates proper association of the strips and glass. The jig can be made of wooden strips 55 provided with a channel 56 of a depth slightly less than the thickness of the separators. In practice, the inner corners 57 of the channels are rounded so that there is no binding or difficulty with regard to the separators. To assemble Thermopane, the strips 36 which, as has been explained, are coated on two surfaces with adhesive, are first preferably placed upon a pad 58, shown in Fig. 11, of an absorbent character soaked with a solvent for the adhesive upon the strips. Where shellac is the adhesive, the pad 58 may be soaked with ordinary alcohol and if the separators rest upon the pad for a minute or two, enough alcohol will be picked up to soften the shellac to the necessary extent. The strips are then placed into the grooves in the jig, with the adhesive softened surfaces being uppermost. As shown in Fig. 13, the separator 36 is of greater thickness than the depth of channel so that after the four separators have been placed in the jig, a sheet of glass K can be placed on the upper surfaces of the separators, without interference from the jig.

To provide a channel about the marginal portions of the assembly, the separators are cut to a size such that when assembled, the glass sheets extend beyond the edges of the separators. A slight hand pressure upon the sheet of glass K will give enough adherence that the sheet of glass can be moved upwardly and the separators will remain on the under surface thereof. The glass may then be turned over so that the separators will be on its upper surface.

Figure 14:
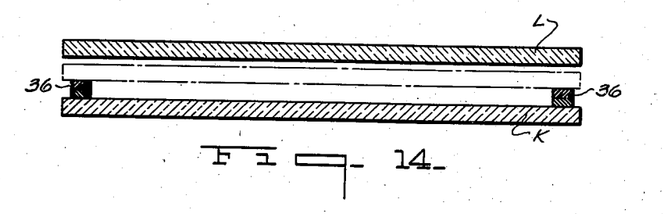
Fig. 14 shows diagrammatically placing of the second sheet of glass upon the separators previously assembled with the first sheet of glass.

In Fig. 14 is illustrated the sheet of glass K carrying the separator strips 36, with a second sheet of glass L (shown in full lines) placed above the glass K and then lowered upon the upper faces of the separators 36 as indicated in dotted lines. It is not necessary that the adhesive coating on the faces of the separators coming in contact with the sheet of glass L be softened at time of assembly because clamps are placed about the edges of the assembly or the assembly is carefully placed in a press to subject it to a heating treatment to promote bonding of the parts together.

While a special jig can be used for proper positioning of the second sheet of glass L, I have found that even inexperienced operators can line up the parts with little or no trouble.

Figure 16:
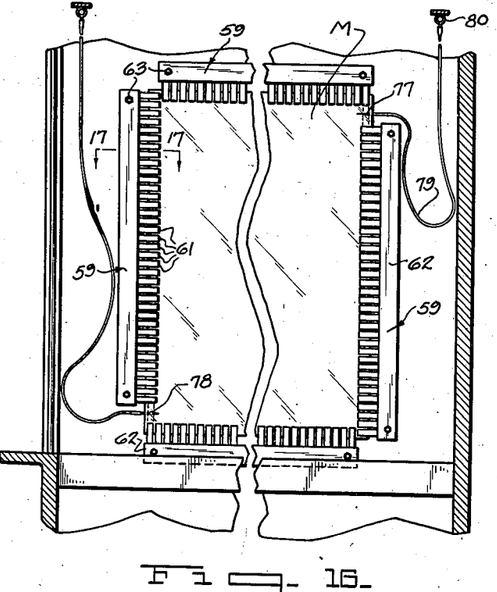
Fig. 16 illustrates one form of pressing means used to effect proper bonding between the glass and separators.
Figure 17:
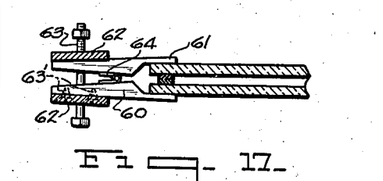
Fig. 17 is a section taken on line 17—17 in Fig. 16.

The Thermopane assembly is now ready for pressing and dehydration treatment. Different forms of pressing means can be employed and two of the different types I have used are illustrated where in Figs. 16 and 17 the assembly is clamped about the edges with the clamping devices, designated in their entirety by the numeral 59. The clamps comprise the multiplicity of spring-pressed devices 60 including the jaws 61 for engaging opposite sides of the Thermopane assembly. A number of the devices 60 are carried by the plates 62 and 62' held together by the bolts 63. In the preferred form, the members 60 are fastened permanently to the plate 62 by means of screws or the like 63' and not secured to the plate 62'. The springs 64 are so arranged that normally the jaws 61 are urged together, thus exerting pressure upon the Thermopane assembly, and to spread the jaws 61 apart the plates 62 and 62' may be moved toward one another. It is convenient to make up clamps 59 in lengths suitable for the different sizes of Thermopane units to be produced and while the individual devices 60 can be placed on the glass one at a time, it is cheaper and generally more satisfactory to make them up into the units as shown so that a group may be placed in position simultaneously. Furthermore, it is not necessary that only one group of clamps be used on each side of the Thermopane assembly as a number of groups of the clamps can be placed upon the glass provided there is a substantially uniform application of pressure about the perimeter of the Thermopane assembly.

Figure 19:
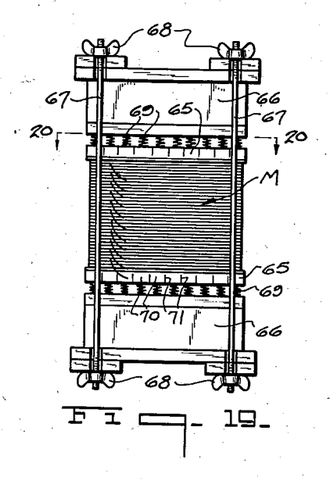
Fig. 19 is an end elevation of another type of pressing means that can be used.
Figures 20, 21, 22:
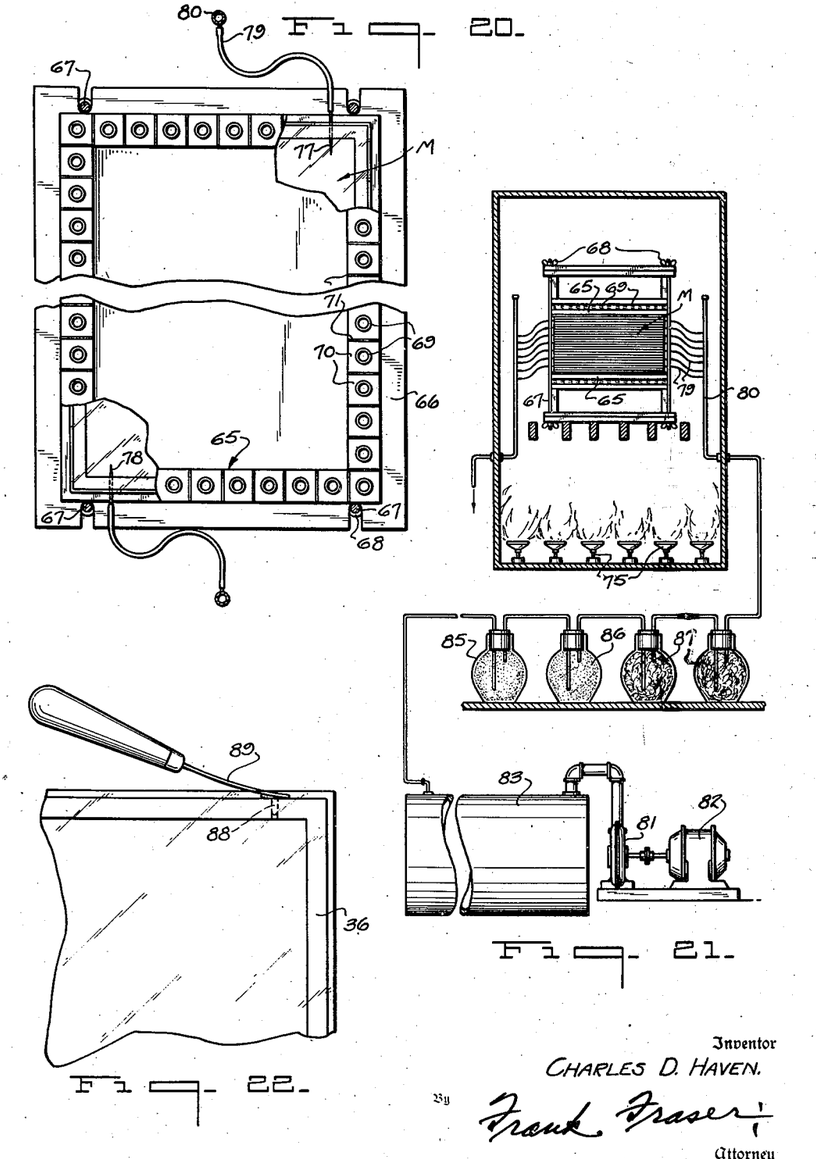
Fig. 20 is a section taken on line 20—20 in Fig. 19.
Fig. 21 is a section through the heating compartment showing a group of fabricated glass assemblies being subjected to pressure and the dehydrating treatment.
Fig. 22 shows plugging of the apertures provided in the channels to permit dehydration of the air space and separators between the glass sheets.

In Figs. 19 and 20 another form of pressing means is shown wherein the Thermopane assemblies M are placed between two platens 65. The press comprises the members 66 connected by the adjustable rods 67 carrying the wing nuts 68 at their ends and between the members 66 and platens 65 are the series of coil springs 69.

The Thermopane assemblies M are simply placed one upon the other and then positioned between the platens, and upon adjustment of the wing nuts 68 pressure is applied to the assemblies through the springs 69 which serve to equalize the pressure applied. As shown more clearly in Fig. 20, the spring retainers 70 have the slots 71 therebetween to give a certain degree of flexibility to the platens 65.

It will of course be understood that the process is not limited to any particular pressing instrumentality employed. The assemblies can be pressed one at a time or a plurality of assemblies can be pressed simultaneously.

Figure 18:
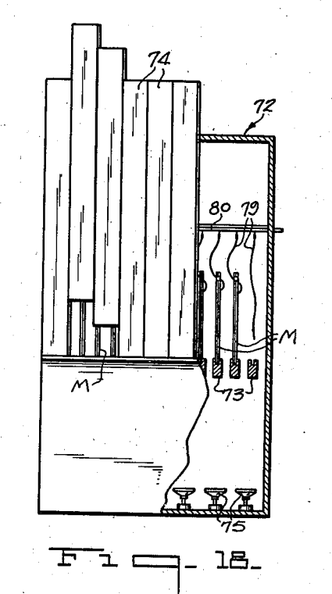
Fig. 18 shows a cabinet in which the assembly can be subjected to heat and pressure during the dehydration of the air and separators between the glass sheets.

After the pressing means have been applied to the assembly, the assembly and pressing means are placed into a cabinet, the temperature of which can be controlled. In Fig. 18 is shown a cabinet 72 provided with the racks 73 for receiving the single Thermopane assemblies M. Vertically movable slides 74 which can be held in a raised position are used to close the opening to the cabinet. Mounted in the bottom of the cabinet are a number of gas burners 75 for controlling the temperature within the cabinet and consequently the heat applied to the Thermopane assemblies. Other forms and constructions of cabinets and types of heating means can be used to accomplish the same results and where preferred, electrical heating means may be substituted for the gas burners illustrated.

Regardless of the form of heating equipment resorted to, the Thermopane assemblies should be subjected to a temperature of approximately 200° F. for a period of about three hours. The heat and pressure treatment thus applied is sufficient to promote an adequate and permanent bond between the glass sheets and separator strips as well as between the separator strips at their contacting portions when the shellac adhesive is used.

Figure 15:
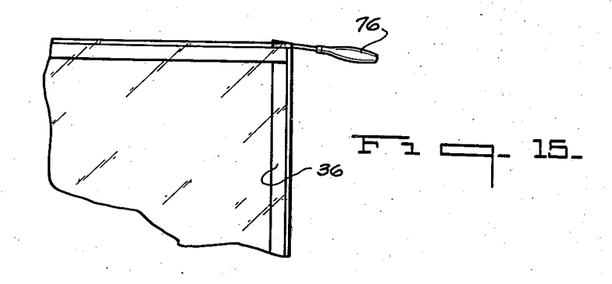
Fig. 15 shows the pressing together of the separator strips at their contacting portions after assembly of the separators and the two sheets of glass.

Either before or after positioning of the clamps upon the Thermopane assembly, the ends of the separators 36 should be pressed together and this is illustrated in Fig. 15 where the implement 76, narrow enough to be received in the channel between the glass sheets, is used to press the ends of the separators together. It will be remembered that those portions of the separators pressed together have been previously coated with a rubber cement as shown in Fig. 10.

At the time the assemblies in the pressing means are placed in the cabinet 72, dehydrating means are connected with the space between the glass sheets. As shown particularly in Figs. 16 and 20, hypodermic needles 77 and 78 are inserted through the transverse openings in the separator strips. The openings were formed by the drill 50 shown in Fig. 9 so that they extend laterally of the Thermopane assembly and the needles can be inserted through the separators into the space between the glass sheets.

The needle 77 is connected by means of a flexible hose 79 to a conduit 80 furnished with a supply of dehydrated air. The needle 78 serves simply as an exhaust for the space between the glass sheets and in some cases the needle is not required as the opening will be satisfactory for exhausting purposes. However, by providing the needle and hose there is less danger of clogging up during the dehydrating treatment.

As shown more particularly in Fig. 21, the conduit 80 receives dehydrated air from the equipment comprising the compressor 81 operated by the motor 82 and filling the tank 83. In addition to dehydrating the air, it is preferably filtered so as to be thoroughly cleaned when introduced into the cavity between the glass sheets. The pipe 84 connected to the tank 83 likewise connects to the jar 85 which may be filled with calcium chloride. One or any number of similar interconnecting jars may be used and filled with calcium chloride. In the illustration, the jar 86 is so equipped. Subsequent jars 87 connected in the same circuit may be filled with cotton and steel wool so that the air is thus completely dehydrated and filtered. It is then passed into the space between the glass sheets, and I prefer to use just sufficient pressure to insure a constant steady flow of air through the space. About one pound of pressure will do.

Because the assemblies are positioned in the heated cabinet for a period of about three hours, I have not found it necessary to heat the dehydrated air externally of the cabinet as it becomes heated sufficiently passing through the conduits and while in the cavity between the glass sheets, although pre-heating of the air can of course be resorted to. During the entire time that the Thermopane assembly is under pressure in the cabinet, dehydrated air is passed through the space between the glass sheets.

Since all materials contain water in some degree, the term "dehydration" is a relative one. As has been pointed out, solid separators are not satisfactory and therefore a type of separator having a slight degree of flexibility is used and in the case of the particular separator hereinabove described, it is a porous material capable of absorbing and holding moisture.

I have found that I can take advantage of this property of the separator and can make it serve a very useful function in the success of the Thermopane construction. During the heating and dehydrating steps, the degree of heat and length of time during which the treatment extends is high enough and long enough to give what I consider to be a super-drying of the separator material and the adhesive. That is, the heating of the assembly drives off volatile matter such as, for example, the alcohol in the adhesive and also moisture present in the separator. The passage of dehydrated air through the space formed between the glass sheets and in contact with the separators renders the separators hygroscopic and therefore they act as a safeguard when the Thermopane is in use because any slight moisture that might possibly be entrapped within the Thermopane is taken up by the super-dried separator and thus not permitted to condense on the surfaces of the glass when subjected to low temperatures.

The degree of dehydration required is high especially where the Thermopane is to be mounted in steel sash. When installed in metal sash, the muntins of the sash become very hot in summer, so that the separator must be dry enough that this heat will not drive out any moisture therefrom causing condensation to form on the glass surfaces. The muntins absorb the radiant heat from the sun while the glass transmits most of the radiant heat. This temperature difference will result in condensation if there is enough moisture present in the strip material or in the air trapped between the glass sheets.

Therefore, by super-drying the separator, a hygroscopic condition is produced whereby the separator itself acts as a constant means for keeping the air in a dehydrated condition so that a slight seepage of moisture which might possibly pass through the sealing coatings can be tolerated.

The importance of this super-drying of the separators to render them hygroscopic in nature cannot be overemphasized, especially when it is considered that the volume of air in the space is so small that only a trace of moisture can be held in the air without reaching saturation. The volume of moisture which the rubber type separator can hold when properly dried is far greater than the capacity of the air itself to hold moisture so that a definite protection against free moisture in the air is had for a considerable length of time.

At the end of the heating and dehydrating treatments, the bonded glass and separator assembly is removed and within a reasonably short time the openings provided for the insertion of the hypodermic needles are plugged with a suitable rubber cement 88 by means of the tool 89 as shown in Fig. 22.

Up to this point in the manufacture of Thermopane, a proper separator has been provided, the assembly has been made, the air in the space between the glass sheets dehydrated, and the separator super-dried whereby to maintain the space free from moisture, thus eliminating possibility of objectionable condensation on the inner surfaces of the glass sheets when the Thermopane unit is in use.

It is now necessary to protect the conditions as thus established. The Thermopane must remain air-tight, water-tight, and must resist hygroscopic action from leading any volume of moisture into the air space or the separator material. Further, it must be able to resist the action of the usual oils employed in putty and all other substances to which the glass is subjected.

Extreme care must therefore be used in properly and permanently sealing the interior of the Thermopane construction from all of these destructive elements. So far no single material has been found capable of giving the necessary protection as a seal. Single coatings of innumerable materials and mixtures have been applied and tests have shown such single coatings to be defective. The mere painting of the edges with shellac, paint, gums, and the like will not suffice. In a relatively very short time, glass protected in this way will fail.

Figure 25:
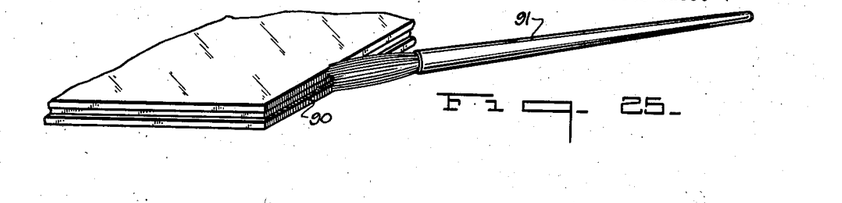
Fig. 25 shows the application of the first coating of sealing material to the edges of Thermopane.
Figure 26:
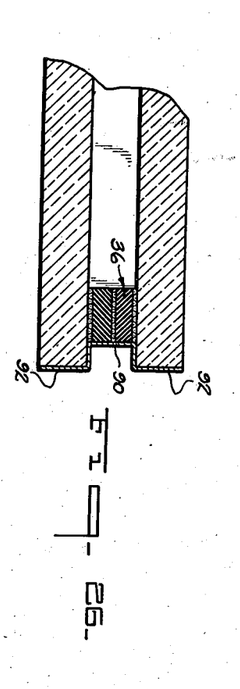
Fig. 26 is a vertical transverse section showing the first application of seal.

I have found that Thermopane can be properly sealed by first applying a film of a good grade of spar varnish upon the edges of the fabricated structure. As shown in Fig. 25, a layer of varnish 90 is being applied by means of a brush 91 to the edges of the glass and separator strip. In Fig. 26, this film 90 is clearly indicated and it will be noted that the film extends to the outer surfaces of the glass sheets as at 92. This first coating, which is preferably a spar varnish, penetrates any cracks or holes which may exist in the separator 36, or in the bond between the separator and the glass. This particular coating does not necessarily have to be water or oil proof, or hygroscopic proof, its main function being to provide suitable adhesion to the glass for subsequent coats to be applied. The layer of varnish is allowed to dry for a period of from 4 to 24 hours, depending upon the temperature, humidity, amount of drier in the varnish, and other conditions.

Figures 27, 28:
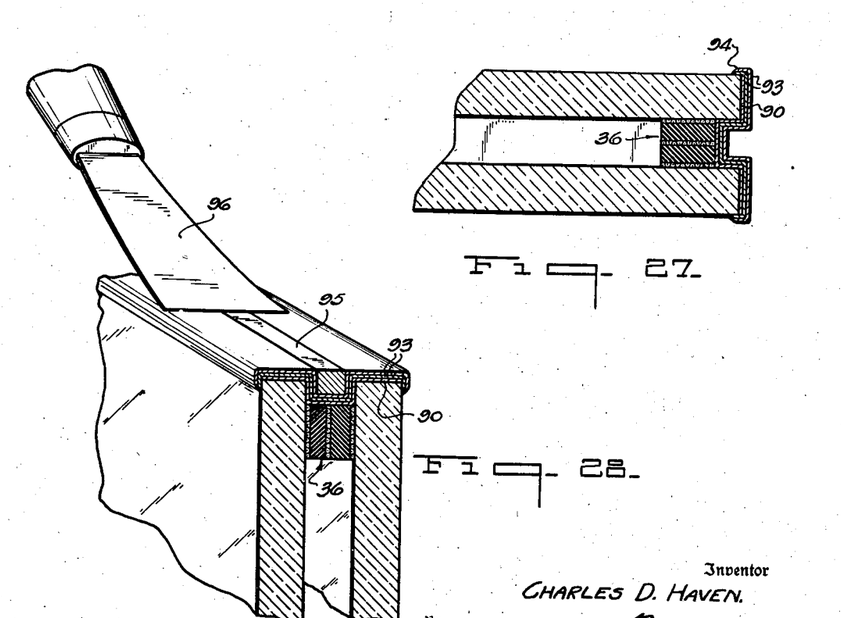
Fig. 27 is a similar view showing in an exaggerated manner three coatings of seal material.
Fig. 28 shows application of the final portion of the seal.

Following this, one or several coatings of rubber paint are applied to the varnish coated edges and, as shown in the example in Fig. 27, two of such rubber coatings 93 are used. The rubber coatings extend beyond the varnish coating as at 94 to protect it from the elements. Approximately a twelve hour drying period is allowed between the rubber paint coats. The rubber paint does not in itself adhere well to smooth surfaces such as glass or at least sufficiently well to withstand strains, shocks, and jars to which the glass is subjected when in use. On the other hand, the rubber paint adheres well to the spar varnish and affords complete protection against moisture, oils, and other injurious elements.

After drying of the final rubber paint coat, the remainder of the channel left is filled with a rubber putty 95 by means of the knife 96 as shown in Fig. 28.

The efficacy of the seal comprising the various compounds as just described can be determined by submerging the Thermopane into a bath of water. To make the test more severe, the temperature of the water can be alternately changed from about 40° F. to about 125° F. Such changes in temperature tend to cause internal pressure changes and if the bond and the sealing compounds are not adequate, the glass will fail.

Thermopane made as above described can be immersed in water, the temperature of which can be varied, and it will be found that notwithstanding this severe treatment, there will be no seepage of moisture or the like into the space between the glass sheets nor will condensation take place on the inner surfaces of the glass sheets.

Figure 29:
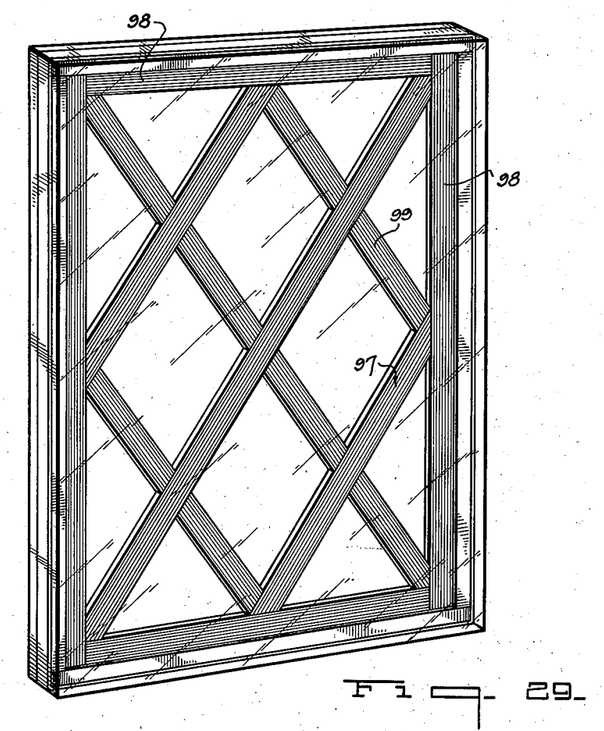
Fig. 29 is a perspective view illustrating a grid arranged in the space between the glass sheets to give Thermopane simulating leaded glass.
Figure 30:
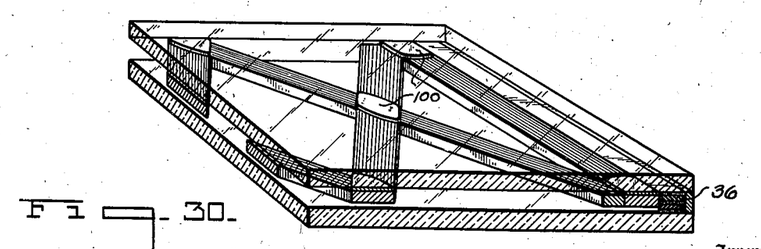
Fig. 30 is a fragmentary perspective, partly in section, thereof.

In Figs. 29 and 30 is disclosed a leaded glass type of thermopane wherein a metallic grid 97 is disposed within the space between the glass sheets. Naturally, any desired design of grid can be used, depending upon the desires of the user, and in the illustration the border strips 98 have arranged between them in the same plane the diagonal strips 99, giving the diamond design.

As is shown more clearly in Fig. 30, the thickness of the strips comprising the grid 97 is less than the space between the glass sheets. This is important where the strips are of metal such as lead so that they can grow or expand when in use without adversely affecting the glass sheets, separator, or seal. To prevent rattling of the metallic grid, at spaced points spots of adhesive 100 can be provided as is shown in Fig. 30, and preferably in such instances the grid is cemented to one of the sheets of glass at spaced points, the areas of cement being sufficient to hold the grid in slightly spaced relation to the sheet of glass to which it is attached and in complete spaced relation at time of manufacture with respect to the other sheet of glass. The smaller thicknesses of grids are important to permit the glass to bond to the separator strips around the edges of the glass.

The strips forming the design can be joined together in any desired manner. For example, where lead strips are used, they can be joined together by solder or by imitation solder cement. However, it is not necessary to use lead strips as other materials can be used, such as paper, wood, imitation lead, etc.

In some cases it may be desirable to have spots of adhesive material on both sides of the grid so that it will be spaced from both sheets of glass, the adhesive serving not only as a cementing medium but also as a spacer to keep the grid out of contact with both sheets of glass.

The grid is placed between the glass at time of assembly and does not interfere with dehydration of the air in the space or with the super-drying of the separators themselves. When installed, Thermopane provided with the grids gives the appearance of the customary leaded glass and, in addition to its artistic value, has all of the advantages of the Thermopane not provided with the decorative grids.

Divisional applications are being filed claiming subject matter disclosed but not claimed herein.

I claim:

1. A multi-ply glass sheet glazing unit of the character described comprising a plurality of glass sheets, yieldable separator strips bonded between the glass sheets at spaced points entirely around their perimeters forming a hermetically sea'ed space therebetween, and a weatherproof protective seal arranged exteriorly of the separator strips.

2. A multi-ply glass sheet glazing unit of the character described comprising a plurality of glass sheets, yieldable laminated rubber compound separator strips bonded between the glass sheets at spaced points entirely around their perimeters forming a hermetically sealed space therebetween, and a weather-proof protective seal arranged exteriorly of the separator strips.

3. A multi-ply glass sheet glazing unit of the character described comprising a plurality of glass sheets, yieldable rubber compound separator strips bonded between the glass sheets at spaced points entirely around their perimeters forming a hermetically sealed space therebetween, and a weather-proof protective seal arranged exteriorly of the separator strips.

4. A multi-ply glass sheet glazing unit of the character described comprising a plurality of glass sheets, yieldable separator strips formed of rubber compound and fabric laminations bonded between the glass sheets at spaced points entirely around their perimeters forming a hermetically sealed space therebetween, and a weather-proof protective seal arranged exteriorly of the separator strips.

5. A multi-ply glass sheet glazing unit of the character described comprising a plurality of glass sheets, yieldable, fabric faced rubber compound separator strips bonded between the glass sheets at spaced points entirely around their perimeters forming a hermetically sealed space therebetween, and a weather-proof protective seal arranged exteriorly of the separator strips.

6. A multi-ply glass sheet glazing unit of the character described comprising a plurality of glass sheets, yieldable separator strips having serrated outer surfaces bonded between the glass sheets at spaced points entirely around their perimeters forming a hermetically sealed space therebetween, and a weather-proof protective seal arranged exteriorly of the separator strips.

7. A multi-ply glass sheet glazing unit of the character described comprising a plurality of glass sheets, yieldable rubber compound, fabric faced separator strips, whose fabric facings are roughened, bonded between the glass sheets at spaced points entirely around their perimeters forming a hermetically sealed space therebetween, and a weather-proof protective seal arranged exteriorly of the separator strips.

8. A multi-ply glass sheet glazing unit of the character described comprising a plurality of glass sheets, yieldable separator strips bonded between the glass sheets at spaced points entirely around their perimeters forming a hermetically sealed space therebetween filled with dehydrated air, and a weather-proof protective seal arranged exteriorly of the separator strips.

9. A multi-ply glass sheet glazing unit of the character described comprising a plurality of glass sheets, yieldable dehydrated separator strips bonded between the glass sheets at spaced points entirely around their perimeters forming a hermetically sealed space therebetween, and a weather-proof protective seal arranged exteriorly of the separator strips.

10. A multi-ply glass sheet glazing unit of the character described comprising a plurality of glass sheets, yieldable dehydrated separator strips bonded between the glass sheets at spaced points entirely around their perimeters forming a hermetically sealed space therebetween filled with dehydrated air, and a weather-proof protective seal arranged exteriorly of the separator strips.

11. A multi-ply glass sheet glazing unit of the character described comprising a plurality of glass sheets, yieldable hygroscopic separator strips bonded between the glass sheets at spaced points entirely around their perimeters forming a hermetically sealed space therebetween containing dehydrated air, the capacity of the separator strips to hold moisture being greater than that of the volume of air within said space whereby the air is maintained in a dehydrated condition to prevent condensation of moisture upon the inner surfaces of the glass sheets, and a weather-proof protective seal arranged exteriorly of the separator strips.

12. A multi-ply glass sheet glazing unit of the character described comprising a plurality of glass sheets made from a soda-lime batch, the surfaces of the glass sheets having been treated to free them from water soluble alkalies, yieldable separator strips bonded between the glass sheets at spaced points entirely around their perimeters forming a hermetically sealed space therebetween containing dehydrated air, and a weather-proof protective seal arranged exteriorly of the separator strips.

13. A multi-ply glass sheet glazing unit of the character described comprising a plurality of glass sheets made from a soda-lime batch, which glass sheets have been soaked in water to remove water soluble alkalies at the surfaces thereof and other water soluble substances and then subjected to a solvent for removing water insoluble substances therefrom, yieldable separator strips bonded between the glass sheets at spaced points entirely around their perimeters forming a hermetically sealed space therebetween containing dehydrated air, and a weather-proof protective seal arranged exteriorly of the separator strips.

14. A multi-ply glass sheet glazing unit of the character described comprising a plurality of glass sheets, yieldable separator strips formed of porous rubber compound faced with roughened fabric bonded between the glass sheets at spaced points with an adhesive penetrating below the surfaces of said separator strips, the separator strips extending entirely around the perimeters of the glass sheets, thus forming a hermetically sealed space therebetween, and a weather-proof protective seal arranged exteriorly of the separator strips.

15. A multi-ply glass sheet glazing unit of the character described comprising a plurality of glass sheets, yieldable separator strips bonded between the glass sheets at spaced points entirely around their perimeters forming a hermetically sealed space therebetween containing dehydrated air, and a multiple layer weather-proof protective seal arranged exteriorly of the separator strips.

16. A multi-ply glass sheet glazing unit of the character described comprising a plurality of glass sheets, yieldable, laminated rubber compound separator strips bonded between the glass sheets at spaced points entirely around their perimeters forming a hermetically sealed space therebetween containing dehydrated air, and a multiple layer weather-proof protective seal arranged exteriorly of the separator strips.

17. A multi-ply glass sheet glazing unit of the character described comprising a plurality of glass sheets, yieldable, laminated rubber compound, fabric faced separator strips bonded between the glass sheets at spaced points entirely around their perimeters forming a hermetically sealed space therebetween containing dehydrated air, and a multiple layer weather-proof protective seal arranged exteriorly of the separator strips.

18. A multi-ply glass sheet glazing unit of the character described comprising a plurality of glass sheets, yieldable rubber compound separator strips having serrated surfaces, absorbent in character, bonded between the glass sheets entirely around their perimeters forming a hermetically sealed space therebetween containing dehydrated air, and a weather-proof protective seal arranged exteriorly of the separator strips.

19. A multi-ply glass sheet glazing unit of the character described comprising a plurality of glass sheets, yieldable, laminated fabric and rubber compound separator strips having serrated surfaces, absorbent in character, bonded between the glass sheets entirely around their perimeters forming a hermetically sealed space therebetween containing dehydrated air, and a weather-proof protective seal arranged exteriorly of the separator strips.

20. A multi-ply glass sheet glazing unit of the character described comprising a plurality of glass sheets, yieldable, hygroscopic rubber compound separator strips having serrated surfaces, absorbent in character, bonded between the glass sheets entirely around their perimeters forming a hermetically sealed space therebetween containing dehydrated air, and a weather-proof protective seal arranged exteriorly of the separator strips.

CHARLES D. HAVEN.